(12) United States Patent
Steely, Jr. et al.

(10) Patent No.: US 8,468,308 B2
(45) Date of Patent: Jun. 18, 2013

(54) SYSTEM AND METHOD FOR NON-MIGRATORY REQUESTS IN A CACHE COHERENCY PROTOCOL

(75) Inventors: Simon C. Steely, Jr., Hudson, NH (US); Stephen R. Van Doren, Northborough, MA (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1651 days.

(21) Appl. No.: 10/760,659

(22) Filed: Jan. 20, 2004

(65) Prior Publication Data

US 2005/0160235 A1    Jul. 21, 2005

(51) Int. Cl.
*G06F 12/00* (2006.01)
(52) U.S. Cl.
USPC .......................................................... 711/145
(58) Field of Classification Search
None
See application file for complete search history.

(56) References Cited

U.S. PATENT DOCUMENTS

| | | | |
|---|---|---|---|
| 5,301,298 A | 4/1994 | Kagan | |
| 5,489,791 A | 2/1996 | Arima | |
| 5,535,116 A | 7/1996 | Gupta | |
| 5,706,463 A | 1/1998 | Ebrahim | |
| 5,802,577 A | 9/1998 | Bhat | |
| 5,829,040 A | 10/1998 | Son | |
| 5,875,467 A | 2/1999 | Merchant | |
| 5,875,472 A | 2/1999 | Bauman | |
| 5,893,922 A | 4/1999 | Baylor | |
| 5,945,710 A | 8/1999 | Oda | |
| 5,958,019 A | 9/1999 | Hagersten | |
| 5,987,571 A | 11/1999 | Shibata | |
| 6,049,851 A | 4/2000 | Bryg | |
| 6,055,605 A | 4/2000 | Sharma | |
| 6,085,263 A | 7/2000 | Sharma | |
| 6,108,737 A | 8/2000 | Sharma | |
| 6,128,677 A | 10/2000 | Miller | |
| 6,138,218 A | 10/2000 | Arimilli | |
| 6,245,603 B1 | 6/2001 | Shinohara | |
| 6,272,602 B1 | 8/2001 | Singhal | |
| 6,345,342 B1 | 2/2002 | Arimilli | |
| 6,351,784 B1 | 2/2002 | Neal | |

(Continued)

FOREIGN PATENT DOCUMENTS

| | | |
|---|---|---|
| JP | 10-189951 | 7/1998 |
| JP | 2000-232075 | 8/2000 |
| JP | 2003-017578 | 1/2003 |

OTHER PUBLICATIONS

Rajeev, Joshi, et al., "Checking Cache-Coherence Protocols with TLA+", Kluwer Academic Publishers, 2003, pp. 1-8.

(Continued)

*Primary Examiner* — Mardochee Chery

(57) ABSTRACT

A system comprises a first node including data having an associated state. The associated state of the data at the first node is a modified state. The system also comprises a second node operative to provide a non-migratory source broadcast request for the data. The first node is operative in response to the non-migratory source broadcast request to provide the data to the second node and to transition the associated state of the data at the first node from the modified state to an owner state without updating memory. The second node is operative to receive the data from the first node and assign a shared state to an associated state of the data at the second node.

28 Claims, 5 Drawing Sheets

U.S. PATENT DOCUMENTS

| | | | |
|---|---|---|---|
| 6,457,100 B1 | 9/2002 | Ignatowski | |
| 6,467,012 B1 | 10/2002 | Alvarez | |
| 6,484,240 B1* | 11/2002 | Cypher et al. | 711/141 |
| 6,490,661 B1 | 12/2002 | Keller | |
| 6,529,990 B1 | 3/2003 | Kruse | |
| 6,615,319 B2 | 9/2003 | Khare | |
| 6,631,401 B1 | 10/2003 | Keller | |
| 6,631,448 B2 | 10/2003 | Weber | |
| 6,633,960 B1 | 10/2003 | Kessler | |
| 6,654,858 B1 | 11/2003 | Asher | |
| 6,696,729 B2 | 2/2004 | Adachi | |
| 6,711,653 B1 | 3/2004 | Quach et al. | |
| 6,745,272 B2 | 6/2004 | Owen | |
| 6,751,721 B1 | 6/2004 | Webb | |
| 6,877,056 B2 | 4/2005 | Cypher | |
| 6,883,070 B2 | 4/2005 | Martin | |
| 6,922,756 B2 | 7/2005 | Hum | |
| 6,931,496 B2* | 8/2005 | Chen et al. | 711/144 |
| 6,993,631 B2 | 1/2006 | Rowlands | |
| 7,032,079 B1 | 4/2006 | Bauman | |
| 7,143,245 B2 | 11/2006 | Tierney | |
| 7,149,852 B2 | 12/2006 | Van Doren | |
| 7,171,521 B2 | 1/2007 | Rowlands | |
| 7,176,097 B2 | 2/2007 | Hiraizumi | |
| 7,222,220 B2 | 5/2007 | Cypher | |
| 7,395,374 B2 | 7/2008 | Tierney | |
| 2001/0034815 A1 | 10/2001 | Dugan | |
| 2002/0009095 A1 | 1/2002 | Van Doren | |
| 2002/0073071 A1 | 6/2002 | Pong | |
| 2002/0129211 A1* | 9/2002 | Arimilli et al. | 711/146 |
| 2003/0018739 A1 | 1/2003 | Cypher | |
| 2003/0140200 A1 | 7/2003 | Jamil | |
| 2003/0145136 A1 | 7/2003 | Tierney | |
| 2003/0195939 A1* | 10/2003 | Edirisooriya et al. | 709/212 |
| 2003/0200397 A1 | 10/2003 | McAllister | |
| 2003/0217236 A1 | 11/2003 | Rowlands | |
| 2004/0002992 A1* | 1/2004 | Cypher et al. | 707/102 |
| 2004/0068624 A1 | 4/2004 | Van Doren | |
| 2004/0123047 A1 | 6/2004 | Hum | |
| 2004/0123052 A1 | 6/2004 | Beers | |
| 2004/0181636 A1* | 9/2004 | Martin et al. | 711/152 |
| 2005/0013294 A1 | 1/2005 | Cypher | |
| 2005/0053057 A1 | 3/2005 | Deneroff | |
| 2005/0060502 A1 | 3/2005 | Tan | |
| 2005/0160238 A1 | 7/2005 | Steely, Jr. | |
| 2005/0251626 A1 | 11/2005 | Glasco | |
| 2005/0251631 A1* | 11/2005 | Rowlands et al. | 711/145 |

OTHER PUBLICATIONS

Martin, Milo M.K., et al., "Token Coherence: Decoupling Performance and Correctness", ISCA-30, pp. 1-12, Jun. 9-11, 2003.
Acacio, Manuel E., et al., "Owner Prediction for Accelerating Cache-to-Cache Transfer Misses in a cc-NUMA Architecture", IEEE 2002.
Gharachorloo, Kourosh, et al., "Architecture and Design of AlphaServer GS320", Western Research Laboratory, (Date Unknown).
Gharachorloo, Kourosh, et al., "Memory Consistency and Event Ordering in Scalable Shared-Memory Multiprocessors", Computer Systems Laboratory, pp. 1-14, (Date Unknown).
Notice of Allowance dated Jun. 8, 2006 for U.S. Appl. No. 10/761,044 in the United States.
Final Office Action dated Mar. 21, 2007 for U.S. Appl. No. 10/760,599 in the United States.
Non-Final Office Action dated Oct. 6, 2006 for U.S. Appl. No. 10/760,599 in the United States.
Non-Final Office Action dated Apr. 19, 2006 for U.S. Appl. No. 10/760,599 in the United States.
Final Office Action dated Apr. 18, 2007 for U.S. Appl. No. 10/760,640 in the United States.
Non-Final Office Action dated Oct. 10, 2006 for U.S. Appl. No. 10/760,640 in the United States.
Non-Final Office Action dated Apr. 19, 2006 for U.S. Appl. No. 10/760,640 in the United States.
Final Office Action dated Dec. 4, 2006 for U.S. Appl. No. 10/760,813 in the United States.
Non-Final Office Action dated Jun. 29, 2006 for U.S. Appl. No. 10/760,813 in the United States.
Non-Final Office Action dated May 14, 2009 for U.S. Appl. No. 10/761,048 in the United States.
Non-Final Office Action dated Sep. 17, 2008 for U.S. Appl. No. 10/761,048 in the United States.
Final Office Action dated Mar. 13, 2007 for U.S. Appl. No. 10/760,652 in the United States.
Non-Final Office Action dated Jul. 25, 2006 for U.S. Appl. No. 10/760,652 in the United States.
Notice of Allowance dated Feb. 28, 2008 for U.S. Appl. No. 10/760,651 in the United States.
Non-Final Office Action dated Sep. 7, 2007 for U.S. Appl. No. 10/760,651 in the United States.
Non-Final Office Action dated Mar. 28, 2007 for U.S. Appl. No. 10/760,651 in the United States.
Non-Final Office Action dated Oct. 18, 2006 for U.S. Appl. No. 10/760,651 in the United States.
Non-Final Office Action dated May 19, 2006 for U.S. Appl. No. 10/760,651 in the United States.
Non-Final Office Action dated Dec. 19, 2005 for U.S. Appl. No. 10/760,651 in the United States.
Notice of Allowance dated Jun. 29, 2006 for U.S. Appl. No. 10/761,034 in the United States.
Final Office Acton dated Apr. 20, 2007 for U.S. Appl. No. 10/760,659 in the United States.
Non-Final Office Acton dated Nov. 17, 2006 for U.S. Appl. No. 10/760,659 in the United States.
Non-Final Office Acton dated May 23, 2006 for U.S. Appl. No. 10/760,659 in the United States.
Final Office Acton dated Mar. 29, 2007 for U.S. Appl. No. 10/761,073 in the United States.
Non-Final Office Acton dated Oct. 6, 2006 for U.S. Appl. No. 10/761,073 in the United States.
Notice of Allowance dated Sep. 27, 2006 for U.S. Appl. No. 10/760,463 in the United States.
Non-Final Office Action dated Mar. 31, 2006 for U.S. Appl. No. 10/760,463 in the United States.
Final Office Action dated Nov. 4, 2005 for U.S. Appl. No. 10/760,463 in the United States.
Non-Final Office Action dated Feb. 25, 2005 for U.S. Appl. No. 10/760,463 in the United States.
Non-Final Office Action dated Sep. 22, 2004 for U.S. Appl. No. 10/760,463 in the United States.
Notice of Allowance dated Jun. 2, 2009 for U.S. Appl. No. 10/761,047 in the United States.
Final Office Action dated Feb. 4, 2009 for U.S. Appl. No. 10/761,047 in the United States.
Non-Final Office Action dated Aug. 20, 2008 for U.S. Appl. No. 10/761,047 in the United States.
Non-Final Office Action dated Mar. 6, 2008 for U.S. Appl. No. 10/761,047 in the United States.
Non-Final Office Action dated Sep. 20, 2007 for U.S. Appl. No. 10/761,047 in the United States.
Final Office Action dated Jun. 14, 2007 for U.S. Appl. No. 10/761,047 in the United States.
Non-Final Office Action dated Dec. 18, 2006 for U.S. Appl. No. 10/761,047 in the United States.
Non-Final Office Action dated Jun. 15, 2006 for U.S. Appl. No. 10/761,047 in the United States.
Scheurich et al., "The Design of a Lockup-free Cache for High-Performance Multiprocessors", Nov. 14-18, 1988 Supercomputing '88 (vol. 1) Proceedings pp. 352-359.
Laudon et al., "The SGI Orgin: A ccNUMA Highly Scalable Server", 1997 International Conference on Computer Architecture, pp. 241-251.
Martin, Milo M.K., et al., "Token Coherence: Decoupling Performance and Correctness", ISCH-30, pp. 1-12, Jun. 9-11, 2003.
Rajeev, Joshi et al., "Checking Cache-Coherence Protocols With TLA+", Kluwer Adacemic Publishers, 2003, pp. 1-8.
Handy, "The Cache Memory Book", 1998, Academic Press second edition, pp. 144-155.

Chen et al., "Write Caching in Distributed Filed Systems", Distributed Computing Systems, 1995., Proceedings of the 15th Int'l Con., May 30-Jun. 2, 1995, pp. 457-466.

Archibald et al., "Cache Coherence Portocols: Evaluation Using a Mulitprocessor Simulation Model", Nov. 1986, ACM Transactions on Computer Systems, pp. 273-298.

Gharachorloo, Kourosh et al., "Architecture and Design of AlphaServer GS320", Western Research Laboratory, (Date Unknown).

Gharachorloo, Kourosh et al., "Memory Consistency and Event Ordering in Scalable Shared-Memory Multiprocessors", Computer Systems Laboratory, pp. 1-14(Date Unknown).

Martin et al., "Bandwidth Adaptive Snooping", Proceedings of the Eighth International Symposium on High-Performance Computer Architecture (HPCA'02), 2002 IEEE.

Acacio, Manuel et al., "Owner Prediction for Accelerating Cache-to-Cache Transfer Misses in a cc-NUMA Architecture", IEEE 2002.

Examiner's Answer dated Jan. 31, 2008 for U.S. Appl. No. 10/760,599 in the United States.

Examiner's Answer dated Aug. 22, 2008 for U.S. Appl. No. 10/760,640 in the United States.

Examiner's Answer dated Jun. 17, 2008 for U.S. Appl. No. 10/760,813 in the United States.

Examiner's Answer dated Jun. 10, 2008 for U.S. Appl. No. 10/760,652 in the United States.

Examiner's Answer dated Feb. 8, 2008 for U.S. Appl. No. 10/760,659 in the United States.

Examiner's Answer dated Mar. 13, 2008 for U.S. Appl. No. 10/761,073 in the United States.

Examiner's Interview Summery dated Jan. 28, 2008 for U.S. Appl. No. 10/760,651 in the United States.

* cited by examiner

SYSTEM AND METHOD FOR NON-MIGRATORY REQUESTS IN A CACHE COHERENCY PROTOCOL

RELATED APPLICATIONS

This application is related to the following commonly assigned co-pending patent applications entitled: "CACHE COHERENCY PROTOCOL WITH ORDERING POINTS," application Ser. No. 10/760,640; "SYSTEM AND METHOD FOR RESOLVING TRANSACTIONS IN A CACHE COHERENCY PROTOCOL," application Ser. No. 10/760,813; "SYSTEM AND METHOD TO FACILITATE ORDERING POINT MIGRATION," application Ser. No. 10/761,048; "SYSTEM AND METHOD TO FACILITATE ORDERING POINT MIGRATION TO MEMORY,"; "SYSTEM AND METHOD FOR CREATING ORDERING POINTS," application Ser. No. 10/760,652 "SYSTEM AND METHOD FOR CONFLICT RESPONSES IN A CACHE COHERENCY PROTOCOL WITH ORDERING POINT MIGRATION," application Ser. No. 10/760,651; "SYSTEM AND METHOD FOR READ MIGRATORY OPTIMIZATION IN A CACHE COHERENCY PROTOCOL," application Ser. No. 10/761,044; "SYSTEM AND METHOD FOR BLOCKING DATA RESPONSES," application Ser No. 10/761,034; "SYSTEM AND METHOD FOR CONFLICT RESPONSES IN A CACHE COHERENCY PROTOCOL WITH ORDERING POINT MIGRATION," application Ser. No. 10/761,073; "SYSTEM AND METHOD FOR CONFLICT RESPONSES IN A CACHE COHERENCY PROTOCOL," application Ser. No. 10/761,047; "SYSTEM AND METHOD FOR RESPONSES BETWEEN DIFFERENT CACHE COHERENCY PROTOCOLS," application Ser. No. 10/760,436, all of which are filed contemporaneously herewith on Jan. 20, 2004 and are incorporated herein by reference.

BACKGROUND

Multi-processor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable fast access to data. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location, the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches monitors (or snoops) requests to the system. The other caches respond by indicating whether a copy of the requested data is stored in the respective caches. Thus, correct ownership and usage of the data are determined by the collective responses to the snoops.

SUMMARY

One embodiment of the present invention may comprise a system that includes a first node including data having an associated state. The associated state of the data at the first node is a modified state. The system also includes a second node operative to provide a non-migratory source broadcast request for the data. The first node is operative in response to the non-migratory source broadcast request to provide the data to the second node and to transition the associated state of the data at the first node from the modified state to an owner state without updating memory. The second node is operative to receive the data from the first node and assign a shared state to an associated state of the data at the second node.

Another embodiment of the present invention may comprise a multi-processor network that includes memory for storing data and a first processor node having a first processor node cache line including the data. The first processor node cache line has an associated state. The associated state of the first processor node cache line is a modified state. The multi-processor network also includes a second processor node operative to provide a non-migratory source broadcast read request for the data. The second processor node has a second processor node cache line with an associated state. The first processor node is programmed to respond to the non-migratory source broadcast read request of the second processor node by providing a shared data response to the second processor node and transitioning the associated state of the first processor node cache line from the modified state to an owner state without updating the memory with the data. The data is stored in the second processor node cache line and the associated state of the second processor node cache line is assigned a shared state.

Another embodiment of the present invention may comprise a computer system that includes a source processor having an associated source processor cache. The source processor is operative to issue a selected one of a non-migratory source broadcast (XREADN) request for data and a migratory source broadcast (XREADM) request for data. The computer system also includes memory storing the data and a target processor having an associated target processor cache with a target processor cache line that stores the data. The target processor cache line has an associated state. The associated state of the target processor cache line is a modified state. The target processor is programmed to respond to the XREADN request by providing a shared data (S-DATA) response to the source processor and by transitioning the associated state of the target processor cache line from the modified state to an owner state without updating the memory. The target processor is programmed to respond to the XREADM request by providing an ownership data (D-DATA) response to the source processor and by transitioning the associated state of the target processor cache line from the modified state to an invalid state without updating the memory.

Another embodiment of the present invention may comprise a method including broadcasting a non-migratory request for data from a first node to other nodes of an associated system. The method also includes providing a shared copy of the data from a second node to the first node in response to the non-migratory request. The method also includes transitioning a state associated with the data at the second node from a modified state to an owner state in response to the non-migratory request. The method further includes transitioning a state associated with the data at the first node to a shared state in response to receiving the shared copy of the data from the second node.

Yet another embodiment of the present invention may comprise a computer system including a cache coherency protocol that is operative to permit migration of data to a cache associated with a source processor from a cache associated with a target processor when a migratory request is issued from the source processor. The protocol is further operative to prevent migration of the data to the cache associated with the source processor from the cache associated with the target processor when a non-migratory request is issued from the source processor.

DETAILED DESCRIPTION

This disclosure relates generally to a coherency protocol that can include a modified cache state (M-state) and an exclusive cache state (E-state) and supports the migration of read data. The protocol employs a dirty state (D-state) and an owner-shared state (O-state) to, under certain circumstances, enable read migration without updating memory, which can help reduce memory bandwidth requirements. Under other circumstances, the protocol also provides for write-back to memory, which helps prevent perpetual data migration. The protocol also employs a migratory read request (XREADM) and a non-migratory read request (XREADN) to help optimize migration and non-migration data access patterns. The implementation of the XREADM and XREADN read requests and the D-state and O-state is useful in multi-processor systems employing a broadcast-based protocol, as well as a hybrid cache coherency protocol, such as a broadcast snoop-based protocol implemented in conjunction with a null-directory or directory-based protocol.

Figure 1:
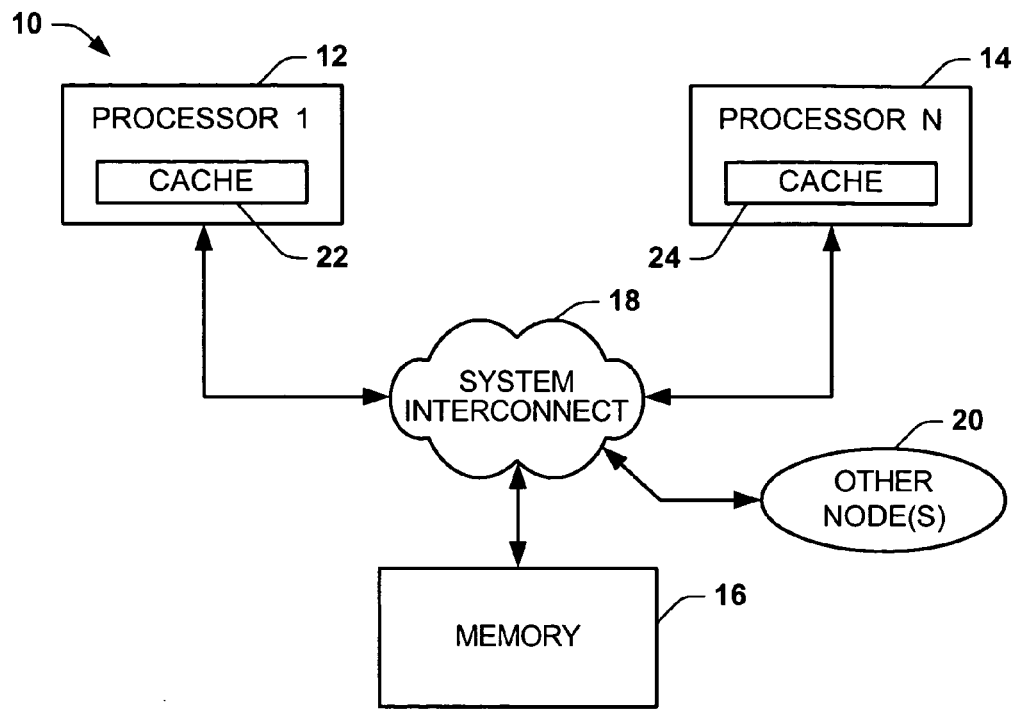
FIG. 1 depicts an example of a multi-processor system.

FIG. 1 depicts an example of a system 10 in which a cache coherency protocol of the present invention may be implemented in order to provide read migratory optimization. The system 10 illustrates a multi-processor environment that includes a plurality of processors 12 and 14 (indicated at PROCESSOR 1 through PROCESSOR N, where N is a positive integer (N>1)). The system 10 also includes memory 16 that provides a single shared address space. The memory 16, for example, can be a globally accessible aggregate memory, such as can be implemented as one or more memory nodes. For example, the memory 16 can include one or more memory storage devices (e.g., dynamic random access memory (DRAM)).

The processors 12 and 14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12 and 14 includes at least one corresponding cache 22 and 24. For purposes of brevity, each of the respective caches 22 and 24 is depicted as unitary memory devices, although the caches may include a plurality of memory devices or different cache levels. Each of the caches 22 and 24 includes a plurality of cache lines. Each cache line has an associated tag address that identifies corresponding data stored in the line. The cache lines can also include information identifying the state of the data for the respective lines.

The system 10 thus employs the caches 22 and 24 and the memory 16 to store blocks of data, referred to herein as "memory blocks." A memory block can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to help ensure coherence of data. The cache coherency protocol of the system 10 utilizes a plurality of states to identify the state of each memory block stored in respective cache lines of the caches 22 and 24 and the memory 16. The coherency protocol establishes rules for transitioning between states, such as if data is read from or written to memory 16 or one of the caches 22 and 24.

As used herein, a node that issues a request, such as a read or write request, defines a source node. Other nodes within the system 10 are potential targets of the request. Additionally, each memory block in the system 10 can be assigned a "home node" that maintains necessary global information and a data value for that memory block.

For example, when a source node, such as the processor 12, requires a copy of a given memory block, the source node typically first requests the memory block from its local, private cache by identifying the tag address associated with the memory block. If the data is found locally, the memory access is resolved without communication via the system interconnect 18. When the requested memory block is not found locally, the source node 12 can request the memory block from the system 10, including the memory 16. In addition to the request identifying a tag address associated with the requested memory block, the request usually identifies the type of request or command being issued by the requester.

Whether the other nodes 14 and the memory 16 will return a response depends upon the type of request, as well as the state of the identified memory block contained in the responding nodes. The protocol implemented by the system 10 defines the available states and possible state transitions.

A set of cache states that can be implemented by the system 10 for a respective cache line is depicted below in Table 1. Since there are seven possible states, the state information can be encoded by a three-bit data word, for example.

TABLE 1

| STATE | DESCRIPTION |
|---|---|
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cached copy in the system and may respond to snoops by returning data. |
| F | First (among equals) - The cache line is valid and unmodified by caching processor. Other processors may have valid copies, and caching processor may respond to snoops by returning data. |
| D | Dirty - The cache line is valid and more up-to-date than memory. The cache line has not been modified by the caching processor, and the caching processor has the only cached copy in the system. The caching processor must respond to snoops by The returning data and must write data back to memory upon displacement. dirty state permits a modified block to be transferred between caches without updating memory. |
| M | Modified - The cache line is valid and has been modified by the caching processor. The caching processor has the only cached copy in the system, and the caching processor must respond to snoops by returning data and must write data back to memory upon displacement. |
| O | Owned - The cache line is valid and more up-to-date than memory. The caching processor cannot modify the cache line. Other processors may have valid copies, and the caching processor must respond to snoops by returning data and must write data back to memory upon displacement. |

As mentioned above, copies of the same data can exist in cache lines of different processor nodes 12 and 14. Shared copies of a memory block can co-exist in different caches of the system in the S-state. With the protocol employing the states defined in Table 1, the cache containing a cache line in the S-state cannot respond to requests by returning data associated with the cache line. Instead, a node containing data in an S-state can respond to a request by returning a non-data shared response, indicating that the cache contains a shared copy of data, and the data can remain in the S-state. A cache line in the S-state may be silently evicted.

An exclusive copy of a memory block can exist only at a single cache of the system in the E-state. A cache containing a cache line in the E-state can respond to requests by returning data associated with the cache line. Since a cache line in the E-state contains data that is unmodified from that stored in memory, a cache line in the E-state can be silently evicted.

A first-among-equals copy of a memory block can exist only at a single cache of the system in the F-state. Other copies may exist at other caches of the system (e.g., in the S-state). A cache containing a cache line in the F-state can respond to requests by returning data associated with the cache line. Since a cache line in the F-state contains data that is unmodified from that stored in memory, a cache line in the F-state can be silently evicted.

A modified copy of a memory block can exist only at a single cache of the system in the M-state. The M-state provides write permission to the processor for writing to a cache line in the M-state. A processor that includes a cache line in the M-state can respond to requests by returning data associated with the cache line. Since, by definition, M-state data can be modified from that stored in memory, and thus may be more up-to-date than memory, write-back is required upon displacement of M-state data.

The inclusion of the D-state and O-state in the cache coherency protocol allows for migration of data, without write-back, when requested from a cache containing the data in the M-state. A migratory read request (XREADM) and non-migratory read request (XREADN) help optimize this data migration by enabling selection of whether data migration is desired. The XREADM request provides for data migration in circumstances that permit migration, and the XREADN request provides for non-migration, even in circumstances that would normally permit migration.

The selection of whether to use the migratory XREADM request or the non-migratory XREADN request may be explicit or implicit. In an explicit use of the XREADM request or XREADN request, the request is selected specifically, such as through a specific program code that calls for the desired request. In an implicit use of the XREADM request or XREADN request, the request is selected in a predictive or intuitive manner, such as by selecting the appropriate request based on a specific address space or processor identity. For example, a source processor can be programmed to select one of the XREADM or XREADN requests based on request trends or patterns for a specific address space or processor identity.

By way of example, assume that the processor 12 (a source node) requires a copy of data associated with a particular memory address, and assume that the data is unavailable from its own local cache 22. Since the processor 12 does not contain a copy of the requested data, the cache line of the processor may be initially in the I-state (invalid) for that data or it may contain different data altogether. For purposes of simplicity of explanation, the starting state of the cache line for this and other examples is the I-state. The processor 12, operating as the source node, transmits a source broadcast request to the other processor 14, to the memory 16, and to the other nodes 20 via the system interconnect 18.

In this example, assume that the processor 12 transmits a source broadcast migratory read (XREADM) request to all other processors 14 in the system 10, including those located in the other nodes 20, as well as to the memory 16. Assume further that the XREADM request is received by the processor 14, which includes a modified copy of the requested data in an M-state cache line of the cache 24. The target processor 14 is a cache ordering point for the data and provides an ownership data response that includes a copy of the requested data to the source processor 12. The target processor 14 also transitions the cache line from the M-state to the I-state.

Upon receiving the data from the target processor 14, the source processor 12 places the data in the appropriate cache line in its cache 22. The source processor 12 transitions the cache line of the cache 22 from the I-state to the D-state. In the D-state, the source processor 12 has the most up-to-date version of the data stored in its cache 22 and has not modified the data (e.g., by writing to the cache line in the cache 22). The data has thus migrated from the target processor 14 to the source processor 12 without write-back to (updating) the memory 16. Additionally, the D-state defines the processor 12 as a new cache ordering point for the data.

Continuing with the above example, assume that a processor (e.g., processor 14) broadcasts a migratory read request (XREADM) for the data, which is stored in the D-state in cache 22 of processor 12, as may occur after the initial read migration described above. The source processor 14 broadcasts an XREADM request to all other processors in the system 10, including the target processor 12 and those located in the other nodes 20, as well as to the memory 16. If the target processor 12 has not modified (e.g., written) the data, the target processor responds by providing a shared data response to the source processor 14 and transitioning the target processor cache line associated with the data from the D-state to the O-state. The requested data is received at the source processor 14 and placed in the appropriate cache line in the source processor cache 24. The source processor 14 cache line transitions from the I-state to the S-state because, at this point, an up-to-date copy of the data is shared by both the source processor 14 (S-state) and the target processor 12 (O-state). Migration from the target processor 12 to the source processor 14 has not occurred because the target had not modified the data at the time of the XREADM request.

In the S-state, the source processor 14 has a valid and unmodified copy of the data. Since other processors may have valid copies of the data, the source processor 14 (being in the S-state) cannot respond to snoops by returning data and cannot write-back the data to memory 16. In the O-state, the target processor 12 has the most up-to-date version of the data stored in its cache 22. The target processor 12 cannot modify the data, and must write-back the data to memory 16 upon displacement (e.g., upon a write request or invalidate issued by another node). The target processor 12, being in the O-state, can respond to read requests by returning shared data, and thus may respond to subsequent read requests from other processors.

Continuing with the above example, as an alternative, assume that a processor (e.g., processor 14) broadcasts a migratory read request (XREADM) for the data stored in the D-state in cache 22 of processor 12, as may occur after the initial read migration described above. The source processor 14 broadcasts an XREADM request to all other processors in the system 10, including the target processor 12 and those located in the other nodes 20, as well as to the memory 16. In this example, however, assume that the target processor 12 has modified the data and thus has written the data to the associated cache line of the target processor and has transitioned the cache line from the D-state to the M-state prior to receiving the XREADM request from the processor 14. In response to receiving the XREADM request broadcast from the source processor 14, the target processor 12 provides an ownership data response to the source processor 14 and transitions the target processor cache line from the M-state to the I-state. The requested data is received at the source processor 14 and placed in the appropriate cache line of the source node cache 24. The cache line of the source node cache 24 transitions from the I-state to the D-state.

The source processor 14, having a D-state associated with the data, has the most up-to-date version of the data stored in its cache 24, and has not modified the data. Thus, in response to the XREADM request, the data has migrated from the target processor 12 to the source processor 14 without write-back to memory 16. The data stored in the source processor 14 in the D-state defines the source processor as an ordering point for the data. The data, being in the D-state in the source processor 14, may thus be subject to further migration, such as where the source processor writes the data and transitions its associated cache line from the D-state to the M-state and thereafter responds to an XREADM request. Alternatively, further migration of the D-state data may not occur, such where the source processor does not write the data and transitions the source processor cache line containing the data from the D-state to the O-state in response to a broadcast snoop request (e.g., XREADM, XREADN) for the data.

As illustrated by the examples set forth above, those skilled in the art will appreciate that the migratory read request (XREADM), in conjunction with the D-state and O-state, provides migration of data without updating memory (write-back). Whether the data migrates in response to the XREADM request depends on whether the target processor writes (modifies) the data. If the data is written by the target processor, the data migrates to the source processor, assumes a D-state in the cache line of the source processor, and is subject to future migration and/or write-back. If the data is not written by the target processor, the target processor transitions to the O-state and a shared copy is sent to the source processor, which transitions its associated cache line to the S-state, and the data is eventually written back to memory. Thus, by requesting data using the XREADM request, migration of the data will occur as long as circumstances (e.g., the cache line states of the other nodes in the system) permit such migration.

The migration of the data without write-back to memory can be beneficial in some specific program or data flow scenarios that may occur in the system 10. In one scenario, more than one processor may read and modify (write) certain data frequently. In this multiple writing processor scenario, since the data can be written relatively frequently by more than one processor, the XREADM request can be implemented as described herein to promote migration from processor to processor without frequent memory updates. This can help reduce memory bandwidth requirements.

Continuing with the above example, assume that a processor (e.g., processor 14) broadcasts a non-migratory read request (XREADN) for the data stored in the cache 22 of processor 12, as may occur after the initial read migration described above. The source processor 14 broadcasts an XREADN request to all other processors in the system 10, including the target processor 12 and those located in the other nodes 20, as well as to the memory 16. Characteristic of the XREADN request, the target processor 12 responds to the XREADN request by providing a shared data response to the source processor 14 and transitioning its cache line associated with the data from the D-state to the O-state. This shared data response occurs regardless of whether the target processor 12 has modified (written) the data. If the cache line of the target processor 12 is in the D-state when the target processor receives the XREADN request broadcast by the source processor 14, the target processor cache line transitions from the D-state to the O-state and provides a shared data response to the source processor. If the cache line of the target processor 12 is in the M-state when the target processor receives the XREADN request issued by the source processor 14 is received, the target processor cache line transitions to the O-state and provides a shared data response to the source processor. In either event, the shared data response is received at the source processor 14 and placed in the appropriate cache line in the source processor cache 24. The source processor cache line transitions from the I-state to the S-state because, at this point, an up-to-date copy of the data is shared by both the source processor 14 (S-state) and the target processor 12 (O-state).

In the S-state, the source processor 14 has a valid and unmodified copy of the data. Since other processors may have valid copies of the data, the source processor 14 (being in the S-state) cannot respond to snoops by returning data and cannot write-back the data to memory 16. In the O-state, the target processor 12 has the most up-to-date version of the data stored in its cache 22. The target processor 12 cannot modify the data, and must write-back the data to memory 16 upon displacement (e.g., upon a write request or invalidate issued by another node). The target processor 12, being in the O-state, can respond to read requests by returning shared data, and thus may respond to subsequent read requests from other processors. Thus, by requesting data using the XREADN request, migration of the data will not occur even if circumstances (e.g., the state of the nodes in the system) would otherwise permit such migration.

As illustrated by the examples set forth above, those skilled in the art will appreciate that the non-migratory read request (XREADN) provides for a non-migratory data flow regardless of whether the target processor writes the data. This non-migratory data flow can be beneficial in some specific program or data flow scenarios that may occur in the system 10. In one such scenario, a single processor may modify (write) certain data frequently while other processors may read the data frequently with no intention of modifying the data. In this single-writer, multiple reader scenario, the XREADN request can be implemented as described herein to promote sharing the data among the requesting processors without needless data migration or extended chains of data migration that extend from processor to processor.

For example, assume that a processor (e.g., target processor 12) performs frequent modifications of certain data. Assume also that another processor (e.g., source processor 14) reads the data frequently without any intention of writing the data. In this example, the cache line of target processor 12 associated with the data may be in the D-state or M-state, depending, for example, on whether the target processor has modified the data. Since the source processor 14 does not intend to write the data, a non-migratory read request (XREADN) for the data is broadcast from the source processor. In response to the XREADN request, the target processor 12 transitions to the O-state and provides a shared data response to the source processor 14, regardless of whether the cache line of the target processor 12 associated with the data was in the D-state or M-state at the time the XREADN request was received at the target processor. The data is received at the source processor 14 and placed in the source processor cache 24. The cache line of the source processor cache 24 transitions from the I-state to the S-state. Subsequently, if the processor 12 needs to modify the data, it may broadcast a request (e.g., a broadcast upgrade line request or a broadcast read modify request) in order to invalidate the shared copies of the data and thereby enable the processor 12 to write the cache line.

Figure 2:
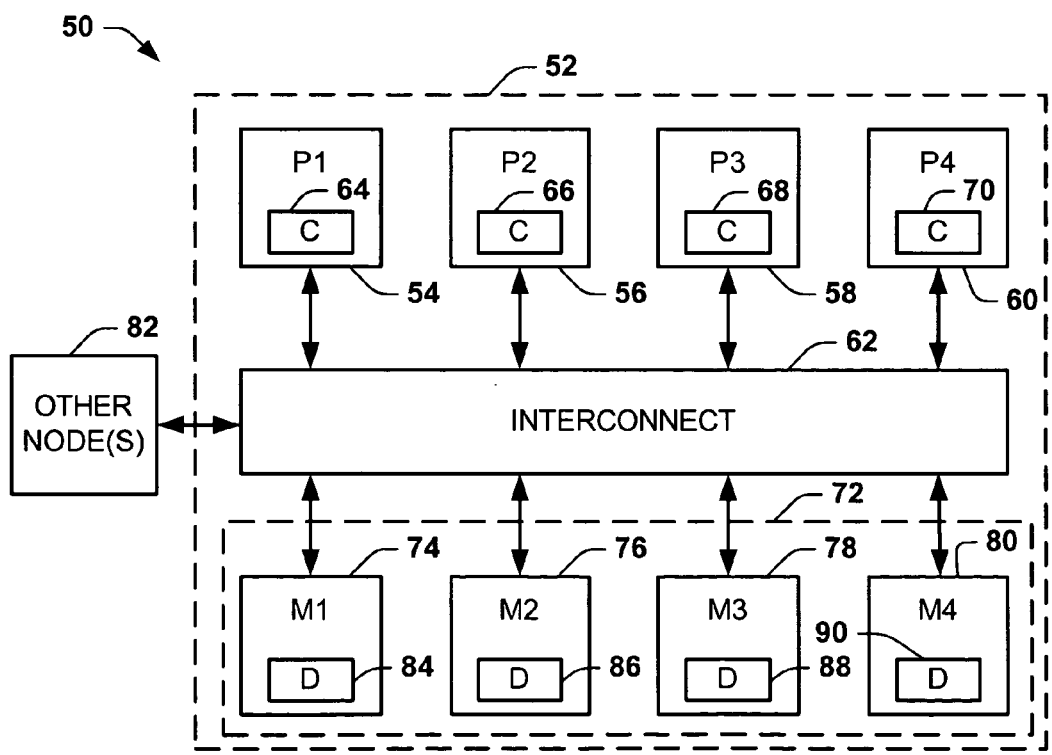
FIG. 2 depicts an example of another multi-processor system.

FIG. 2 depicts an example of a multi-processor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54, 56, 58, and 60 are depicted in the example of FIG. 2, those skilled in the art will appreciate that a greater or smaller number of processors can be implemented in the node 52.

Each processor 54, 56, 58, and 60 also includes an associated cache 64, 66, 68 and 70. The caches 64, 66, 68, and 70 can enable faster access to data than from an associated main memory 72 of the node 52. The system 50 implements a cache coherency protocol designed to guarantee coherency of data in the system. By way of example, the cache coherency protocol can be implemented to include a source broadcast protocol in which broadcast snoops or requests for data are transmitted directly from a source processor to all other processors and memory in the system 50. The source broadcast protocol can further be implemented in conjunction with another forward progress protocol, such as a null-directory or other directory-based protocol. The system 50 of FIG. 2, for example, employs the source broadcast protocol to process a request for data. If the request cannot be processed using the source broadcast protocol, such as where a conflict exists, the system 50 transfers to its forward progress protocol.

The memory 72 can include multiple memory modules (M1, M2, M3, M4) 74, 76, 78 and 80. For example, the memory 72 can be organized as a single address space that is shared by the processors 54, 56, 58 and 60 as well as other nodes 82 of the system 50. Each of the memory modules 74, 76, 78 and 80 can include a corresponding directory 84, 86, 88 and 90 that defines where the corresponding coherent copy of the data should reside in the system 50. Alternatively, the memory modules may contain no directories. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58, and 60 and the memory 70, as well as those to and from the other nodes 82.

When a processor 56 requires desired data, the processor 56 operates as a source and issues a source broadcast snoop (e.g., a broadcast read or broadcast write request) to all other processors 54, 58 and 60 as well as to memory 72 via the interconnect 62. The cache coherency protocol implemented in the system 50 is designed to ensure that a correct copy of the data is returned in response to the source broadcast snoop.

For example, if a source processor 56 broadcasts a migratory read request (XREADM) via the interconnect 62, one of the responses received from the other processors 54, 58 and 60 may indicate that the data exists in one of the other caches (e.g., the cache 68 of target processor 58) as modified (M-state) data. If the data exists in the cache 68 as modified data, the responses from the other processors 54 and 58 are non-data (MISS) responses indicating that a valid copy of the requested data does not exist at such processors. After responses are received from all of the processors 54, 58, and 60, the data migrates from the target processor 58 to the source processor 56, which results in the cache line of cache 66 receiving the requested data and transitioning to the D-state. The D-state operates to define the processor 56 as a new cache ordering point for the data. The associated cache line in the cache 68 of the target processor 58 transitions from the M-state to I-state. The requested data has thus migrated from the target processor 58 to the source processor 56 without updating memory 72 (write-back). With the cache 66 maintaining a D-state cache line for the data received from memory, the processor 56, as the cache ordering point, can now respond to requests for the data by issuing a response that includes a copy of the data to one or more requesting processors 54, 58 or 60 (e.g., the processor 56 may now become a target processor).

In a first scenario, it is assumed that the target processor 56 writes the data and thus transitions the associated cache line of cache 66 from the D-state to the M-state. In the M-state, the processor 56 still operates as the cache ordering point for the data. If source processor 60 broadcasts a migratory read request (XREADM) for the data, the source processor will receive an ownership data response from target processor 56. The other processors 54 and 58 will provide non-data MISS responses indicating that a valid copy of the requested data does not exist in the caches of those processors. The target processor 56, maintaining an M-state cache line for the data, provides the ownership data response to the source processor

60, without write-back. The processor 56 invalidates its associated cache line and transitions its cache line from the M-state to the invalid state (I-state). In response to receiving the response from the target processor 56, the source processor 60 stores the data in an associated cache line and transitions the state associated with the cache line to the D-state. Thus, in this first scenario, the data migrates in response to the XREADM request from the target processor 56 to the source processor 60 without updating memory 72. The source processor 60 also becomes a new cache ordering point for the data due to the transition to the D-state. From this point, further migration may occur in accordance with this paragraph, or migration may cease, depending on whether the processor 60 writes the data, as described herein.

In a second scenario, it is assumed that the processor 56 does not write the data and thus maintains the associated cache line of cache 66 in the D-state. If the source processor 60 broadcasts a migratory read request (XREADM) for the data, the other processors 54 and 58 will provide non-data MISS responses indicating that a valid copy of the requested data does not exist in the caches of those processors. Since the target processor 56 includes the D-state data, the target processor responds by providing a shared data response to the source processor 60 and by transitioning the associated cache line in cache 66 from the D-state to the O-state. The source processor 60 receives the requested data and places the requested data in the appropriate cache line of the source processor cache 70. The source processor 60 transitions this cache line from the I-state to the S-state and, thus, an up-to-date copy of the data is shared by both the source processor 60 (S-state) and the target processor 56 (O-state). The target processor 56 may share the data with subsequent requesting (source) processors, but the data cannot migrate further. Eventually, when the O-state data is displaced from the target processor 56, the data will be written-back to memory 72. Thus, in this second scenario, the data does not migrate, even though the XREADM request was issued by the source processor 60.

In a third scenario, it is assumed that the target processor 56 writes the data and thus transitions the associated cache line of cache 66 to the M-state. If source processor 60 broadcasts a non-migratory read request (XREADN) for the data, the source processor will receive a shared data response from target processor 56. The other processors 54 and 58 will provide non-data MISS responses indicating that a valid copy of the requested data does not exist in the caches of those processors. The cache line for the data in cache 66 of the target processor 56 transitions from the M-state to the O-state and provides the shared data response to the source processor 60. The source processor 60 receives the requested data and places the requested data in the appropriate cache line of the source processor cache 70. The cache line of the source processor cache 70 transitions from the I-state to the S-state and, thus, an up-to-date copy of the data is shared by both the source processor 60 (S-state) and the target processor 56 (O-state). The target processor 56 may share the data with subsequent requesting (source) processors, but the data cannot migrate. Eventually, when the O-state data is displaced from the target processor 56, the data will be written-back to memory 72. Thus, in this third case, the data does not migrate from the target processor 56 to the source processor 60. The data does not migrate because the XREADN request was used to request the data. Although the system 50 was in a condition for permitting migration (the target processor 56 contained M-state data), the use of the XREADN prevented the migration from occurring.

In a fourth case, it is assumed that the target processor 56 does not write the data and thus the associated cache line of cache 66 is in the D-state. If source processor 60 broadcasts a non-migratory read request (XREADN) for the data, the source processor will receive a shared data response from target processor 56. The other processors 54 and 58 will provide non-data MISS responses indicating that a valid copy of the requested data does not exist in the caches of those processors. The cache line for the data in cache 66 of the target processor 56 transitions from the D-state to the O-state and provides the shared data response to the source processor 60. The source processor 60 receives the requested data and places the requested data in the appropriate cache line of the source processor cache 70. The cache line of source processor cache 70 transitions from the I-state to the S-state and, thus, an up-to-date copy of the data is shared by both the source processor 60 (S-state) and the target processor 56 (O-state). The target processor 56 may share the data with subsequent requesting (source) processors, but the data cannot migrate. Eventually, when the O-state data is displaced from the target processor 56, the data will be written-back to memory 72. Thus, in this fourth scenario, the data does not migrate from the target processor 56 to the source processor 60. The data does not migrate because the XREADN request was used to request the data, although the system 50 was not in a condition for permitting migration (the target processor 56 contained D-state data) and migration would not have occurred even if a migratory read request (XREADM) was used.

Figure 3:
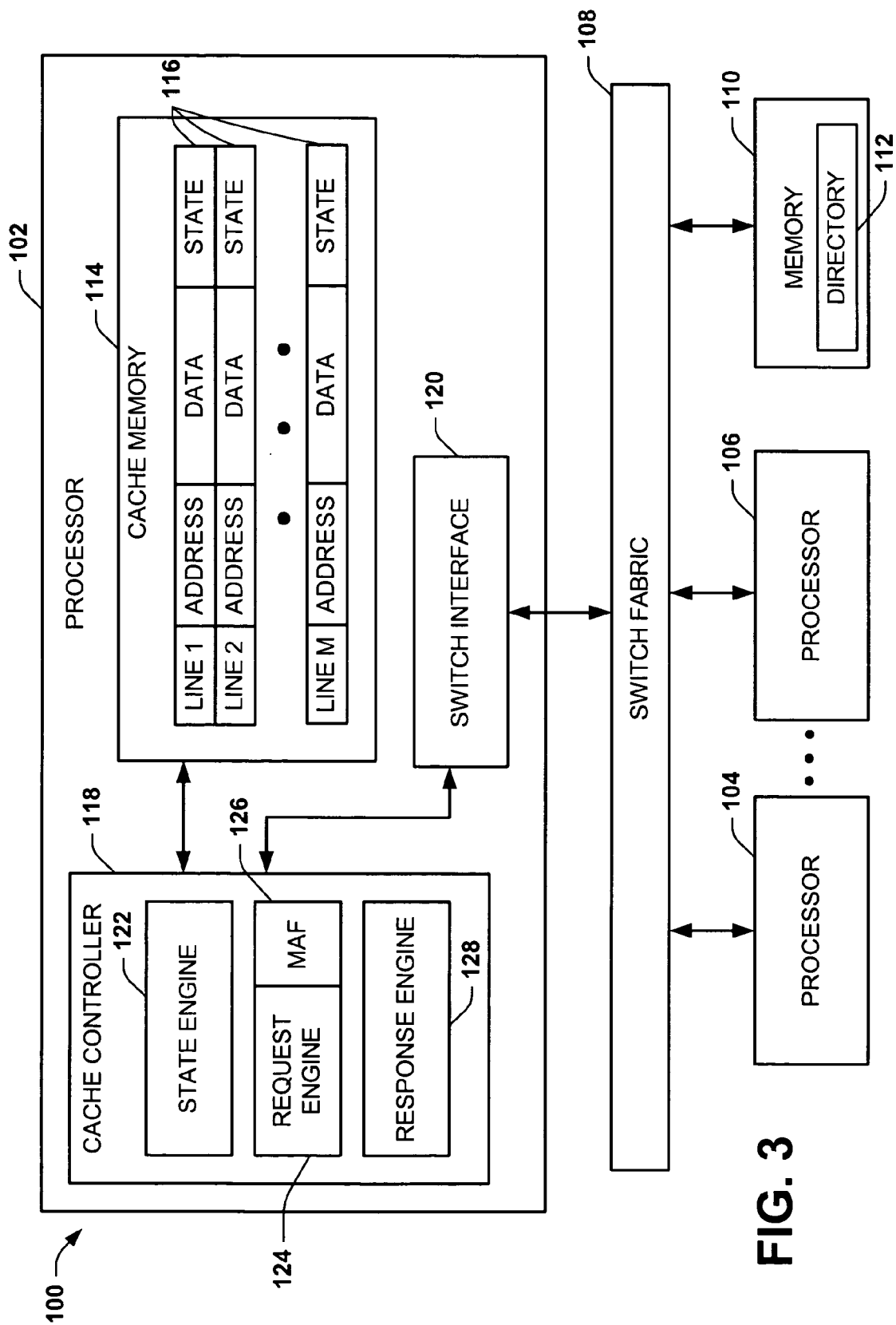
FIG. 3 depicts an example of a processor within a multi-processor system.

FIG. 3 depicts an example of another multi-processor system 100 that includes a plurality of processors 102, 104 and 106 in communication with each other via a switch fabric 108. The system 100 also includes associated memory 110, which can be organized as a single address space that is shared by the processors 102, 104, and 106. For example, the memory 110 can be implemented as a plurality of separate memory modules associated with each of the respective processors 102, 104, and 106 for storing data. The system 100, for example, can be implemented as an integrated circuit or as circuitry containing plural integrated circuits.

The system 100 can employ a source broadcast or source-snoopy cache coherency protocol. For this type of protocol, a source processor 102, 104, and 106 can issue a source broadcast request to all other processors in the system and to the memory 110. In the event that conflict arises, or the source broadcast request otherwise fails, the system 100 can transfer to a forward-progress protocol, such as a null-directory or other directory-based protocol.

In a null directory-based protocol, for example, the memory 110 includes a home node for each respective cache line. Instead of issuing a broadcast to all cache targets, the source issues a single request to the home node for such data. The home node thus operates as static ordering point for requested data since all requests are sent to the home node for ordering before snoops are broadcast. This tends to add an additional hop for the majority of references compared with a broadcast-based protocol described above. If the system 100 employs a standard directory-based protocols, ordering is implemented, but the memory 110 employs associated directories that facilitate locating the data (e.g., based on the directory state associated with the requested data). In a standard directory protocol, there will be times when the directory can indicate that there are no cached copies, and thus the home node can respond with the data without issuing any snoops to the system 100.

The processor 102 includes cache memory 114 that contains a plurality of cache lines (e.g., lines 1–M, where M is a positive integer, M>1) 116. Each cache line 116 can contain one or more memory blocks. A tag address (ADDRESS) is associated with the data contained in each cache line 116. Additionally, each cache line 116 can contain state information identifying the state of the data contained at that cache line. Examples of states that can be associated with each cache line 116 are identified above in Table 1.

A cache controller 118 is associated with the cache memory 114. The cache controller 118 controls and manages access to the cache memory 114, including requests for data and responses. The cache controller 118 communicates requests and responses via a switch interface 120 that is coupled with the switch fabric 108. The switch interface 120, for example, includes an arrangement of queues (e.g., input and output queues) or other data structures that organize both requests and responses issued by the processor 102 as well as requests and responses for execution by the processor.

In the example of FIG. 3, the cache controller 118 includes a state engine 122 that controls the state of each respective line 116 in the cache memory 114. The state engine 122 is programmed and/or configured to implement state transitions for the cache lines 116 based on predefined rules established by the cache coherency protocol implemented in the system 100. For example, the state engine 122 can modify the state of a given cache line 116 based on requests issued by the processor 102. Additionally, the state engine 122 can modify the state of a given cache line 116 based on responses received at the processor 102 for the given tag address, such as may be provided by another processor 104, 106 and/or the memory 110.

Examples of state transitions that can occur in the system 100 for selected processor commands are provided in Table 2. The commands beginning with the term "broadcast" generally correspond to broadcast snoop commands implemented within the context of the source broadcast protocol. Most of the other commands not beginning with the term "broadcast" are examples of typical commands that can be implemented within the context of the forward progress protocol, also implemented by the system 100.

TABLE 2

| Command | Current | | | Next | | | |
|---|---|---|---|---|---|---|---|
| | Source | Owner | Sharer | Source | Owner | Sharer | Memory |
| Broadcast read line code: Non-migratory read request | I | I | I | E or F | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | S | O | I | |
| | I | O | I | S | O | I | |
| | I | O | S | S | O | S | |
| Broadcast read line data: Migratory read request | I | I | I | E | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | D | I | I | |
| | I | O | I | S | O | I | |
| | I | O | S | S | O | S | |
| Broadcast non-coherent read | I | I | I | I | I | I | |
| | I | I | S | I | I | S | |
| | I | E | I | I | E | I | |
| | I | F | I | I | F | I | |
| | I | F | S | I | F | S | |
| | I | D | I | I | D | I | |
| | I | M | I | I | M | I | |
| | I | O | I | I | O | I | |
| | I | O | S | I | O | S | |
| Read line code: Non-migratory read request | I | I | I | E or S | I | I | |
| | I | I | S | S | I | S | |
| | I | E | I | S | S | I | |
| | I | F | I | S | S | I | |
| | I | F | S | S | S | S | |
| | I | D | I | S | S | I | Update |
| | I | M | I | S | S | I | Update |
| | I | O | I | S | S | I | Update |
| | I | O | S | S | S | S | Update |
| Read line data: Migratory read request | I | I | I | E | S | I | |
| | I | I | S | S | S | S | |
| | I | E | I | S | S | I | |
| | I | F | I | S | S | I | |
| | I | F | S | S | S | S | |
| | I | D | I | S | S | I | Update |
| | I | M | I | E | I | I | Update |
| | I | O | I | S | S | I | Update |
| | I | O | S | S | S | S | Update |
| Broadcast read modify with no update | I | I | I | E | I | I | |
| | I | I | S | E | I | I | |
| | I | E | I | E | I | I | |
| | I | F | I | E | I | I | |
| | I | F | S | E | I | I | |
| | I | D | I | D | I | I | |

TABLE 2-continued

| Command | Current | | | Next | | | Memory |
|---|---|---|---|---|---|---|---|
| | Source | Owner | Sharer | Source | Owner | Sharer | |
| | I | M | I | D | I | I | |
| | I | O | I | D | I | I | |
| | I | O | S | D | I | I | |
| Broadcast upgrade | F | — | I | E | I | I | |
| | F | — | S | E | I | I | |
| | O | — | I | D | I | I | |
| | O | — | S | D | I | I | |
| Read modify with no update | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Upgrade un-writable copy | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Invalidate line - no data | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Read modify with update | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Broadcast Victim write | D/M/O | — | I | I | I | I | Update |
| Victim write | D/M/O | — | S | I | I | S | Update |
| Victim | D/M/O | — | I | I | I | I | Update |
| Victim | D/M/O | — | S | I | I | S | Update |

The cache controller 118 also includes a request engine 124 that sends requests to the system 100. The request engine 124 employs a miss address file (MAF) 126 that contains MAF entries for outstanding requests associated with some subset of the locations in the cache memory 114. The MAF 126 can be implemented as a table, an array, a linked list or other data structure programmed to manage and track requests for each cache line. For example, when the processor 102 requires data associated with a given tag address line 116, the request engine 124 creates a corresponding entry in the MAF 126. The MAF entry includes fields that identify, for example, the tag address of the data being requested, the type of request, and response information received from other nodes in response to the request. The request engine 124 thus employs the MAF 126 to manage requests issued by the processor 102 as well as responses to such requests.

The cache controller 118 also includes a response engine 128 that controls responses provided by the processor 102. The processor 102 provides responses to requests or snoops received via the switch interface 120 from another processor 104 and 106 or memory 110. The response engine 128, upon receiving a request from the system 100, cooperates with the state engine 122 and the MAF 126 to provide a corresponding response based on the type of request and the state of data contained in the cache memory 114. For example, if a MAF entry exists for a tag address identified in a request received from another processor or memory, the cache controller can implement appropriate conflict resolution defined by the coherency protocol. The response engine 128 thus enables the cache controller to send an appropriate response to requesters in the system 100. A response to a request can also cause the state engine 122 to effect a state transition for an associated cache line 116.

By way of further example, assume that the processor 102 requires data not contained locally in its cache memory 114. The request engine 124 will create a MAF entry in the MAF 126, corresponding to the type of request and the tag address associated with data required. The cache controller 118 broadcasts a source snoop request to the system 100 via the switch interface 120 and switch fabric 108. The other processors 104 and 106 and memory 110 in the system 100 provide corresponding responses.

If the processor 104 does not include a valid cache line associated with the data for the tag address identified in the read request, the processor returns a corresponding MISS response. As mentioned above, a MISS response can be provided by a target that does not contain a valid cache line for the requested data or if the target cache line contained a valid cache line, but was invalidated at the target (e.g., in response to the request).

If the processor 106 contains a modified (M-state) copy of the data associated with the tag address, the processor returns an ownership data response to the processor 102. The cache line associated with the data at the processor 106 transitions from the M-state to the I-state. All the other processor responses are misses. The request engine 124 writes the data received from the processor 106 to a corresponding line 116 of the cache memory 114, and the MAF entry for the request can be removed from the MAF 126. Additionally, the state engine 122 sets the state of the cache line 116 associated with the data received from memory 110 to the D-state. Since the cache line 116 is now in the D-state, which defines a cache ordering point, the response engine 128 of the processor 102 is capable of responding to requests for the data by sending a copy of the data to the requester. The particular type of response provided by the processor 102 depends on the type of source broadcast request issues by the source processor 102, as illustrated in the scenarios set forth below.

In a first scenario where the processor 102 writes the data, the state engine 122 transitions the cache line 116 from the D-state to the M-state. If a source processor (e.g., processor 104) broadcasts a migratory read request (XREADM) for the data, the target processor 102, being in the M-state for the requested data, defines a cache ordering point for the data and provides an ownership data (D-DATA) response to the source processor 104. The other processors (e.g., processor 106) provide non-data (MISS) responses indicating that a valid copy of the requested data does not exist in the caches of those processors. The target processor 102, after providing the ownership data response, transitions its cache line from the M-state to the I-state. The source processor 104 places the requested data in the appropriate cache line in the source processor cache and transitions the cache line to the D-state, which defines the source processor as a new cache ordering point for the data. Thus, in this first scenario, the data migrates from the target processor 102 to the source processor 104 without write-back to memory in response to the XREADM request. From this point, further migration can occur in accordance with this paragraph, or migration may cease in accordance with the following paragraph. Thus, in this first scenario, the data does not migrate from the target processor 102 to the source processor 104.

In a second scenario where the processor 102 does not write the data, the processor maintains a cache line 116 including the data in the D-state. If the source processor 104 broadcasts an XREADM request, the target processor 102, having a D-state associated with the requested data, provides a shared data (S-DATA) response to the source processor 104. The target processor 102 then transitions the cache line 116 from the D-state to the O-state. The other processors (e.g., processor 106) provide non-data (MISS) responses indicating that a valid copy of the requested data does not exist in the caches of those processors. The source processor 104 places the requested data in the appropriate cache line in the source processor cache and transitions the cache line to the S-state. As a result, an up-to-date copy of the data is shared by both the source processor 104 (S-state) and the target processor 102 (O-state). The target processor 102 (while containing O-state data) can respond to requests for the data by providing shared copies of the data to the requesters, but the data cannot migrate. Eventually, when the O-state data is displaced from the target processor 102, the data will be written-back to memory 110.

In a third scenario where the processor 102 writes the data, the processor maintains a cache line 116 including the data in the M-state. If the source processor 104 broadcasts a non-migratory read request (XREADN), the target processor 102 provides a shared data (S-DATA) response to the source processor 104. The target processor 102 then transitions the cache line 116 from the M-state to the O-state. The other processors (e.g., processor 106) provide non-data (MISS) responses indicating that a valid copy of the requested data does not exist in the caches of those processors. The source processor 104 places the requested data in the appropriate cache line in the source processor cache and transitions the cache line to the S-state. As a result, an up-to-date copy of the data is shared by both the source processor 104 (S-state) and the target processor 102 (O-state). The target processor 102 (while containing O-state data) can respond to requests for the data by providing shared copies of the data to the requesters, but the data cannot migrate. Eventually, when the O-state data is displaced from the cache line 116 of the target processor 102, the data will be written-back to memory 110. Thus, in this third scenario, the data does not migrate from the target processor 102 to the source processor 104, even though the system 100 was in a condition for permitting migration (the target processor 102 contained M-state data). In this third scenario, the XREADN request prevented the migration from taking place.

In a fourth scenario where the processor 102 does not write the data, the processor maintains the data in a cache line 116 including the data in the D-state. If the source processor 104 broadcasts a non-migratory read request (XREADN), the target processor 102 provides a shared data (S-DATA) response to the source processor 104. The target processor 102 then transitions the cache line 116 from the D-state to the O-state. The other processors (e.g., processor 106) provide non-data (MISS) responses indicating that a valid copy of the requested data does not exist in the caches of those processors. The source processor 104 places the requested data in the appropriate cache line in the source processor cache and transitions the cache line to the S-state. As a result, an up-to-date copy of the data is shared by both the source processor 104 (S-state) and the target processor 102 (O-state). The target processor 102 (while containing O-state data) can respond to requests for the data by providing shared copies of the data to the requesters, but the data cannot migrate. Eventually, when the O-state data is displaced from the cache line 116 of the target processor 102, the data will be written-back to memory 110. It will be appreciated that the target processor 56 contained D-state data and, therefore, migration would not have occurred even if an XREADM request was used. The XREADN request thus can help ensure that the data is prevented from migrating from the target processor 102 to the source processor 104.

In view of the foregoing structural and functional features described above, certain methods that can be implemented using a coherency protocol will be better appreciated with reference to FIGS. 4-8. FIGS. 4-7 depict example scenarios that can be implemented in a multi-processor system employing a cache coherency protocol, as described herein. Each of the examples illustrates various interrelationships between requests and responses and state transitions that can occur for a given memory address in different memory devices or caches. In each of these examples, time flows in the direction of an arrow labeled "TIME." Those skilled in the art may appreciate various other cases that can be implemented using the coherency protocols described herein.

Figure 4:
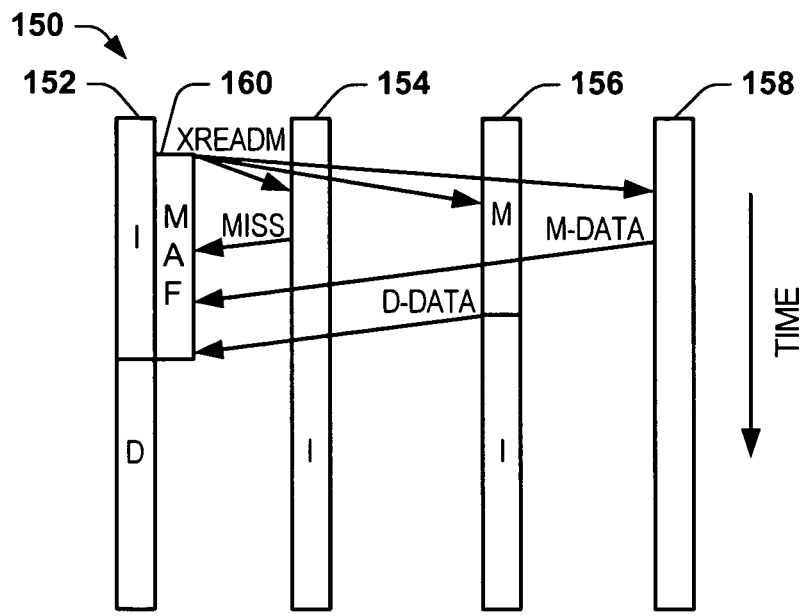
FIG. 4 depicts a first example scenario illustrating state transitions for a coherency protocol.

FIG. 4 illustrates an example scenario in which a network 150 includes a requester or source node 152, target nodes 154 and 156 and a home node 158. Initially, nodes 152 and 154 are in an I-state for a particular cache line, the node 156 is in the M-state for the cache line, and the home node 158 contains a memory copy of the data associated with the cache line. Thus, the node 156 contains the most up-to-date copy of the data in the network. The source node 152 allocates a MAF entry 160 for the requested data and broadcasts a migratory read request (XREADM) to the other nodes 154, 156, and 158. The node 154 returns a MISS response, indicating that the node does not contain a valid copy of data for the tag address identified in the request. The node 156 returns an ownership data (D-DATA) response, indicating that the node contains the most up-to-date copy of the data. The home node 158 for the data returns a copy of the requested data (M-DATA) from memory to the source node 152. After receiving the responses from all other nodes, the source node 152 placed the data in cache and transitions from the I-state to the D-state. The transition to the D-state also defines the node 152 as a new cache ordering point. The D-DATA can override the M-DATA provided by the home node 158 since the D-DATA may be more up-to-date than memory. The node 156 transitions from the M-state to the I-state. The most up-to-date copy of the data has thus migrated from the target node 156 to the source node 152. If the source node 152 modifies (writes) the data, the data may be available for further migration to other requesting nodes. If the source node 152 does not modify (write) the data, the data cannot migrate further and will eventually be written-back to memory 158.

Figure 5:
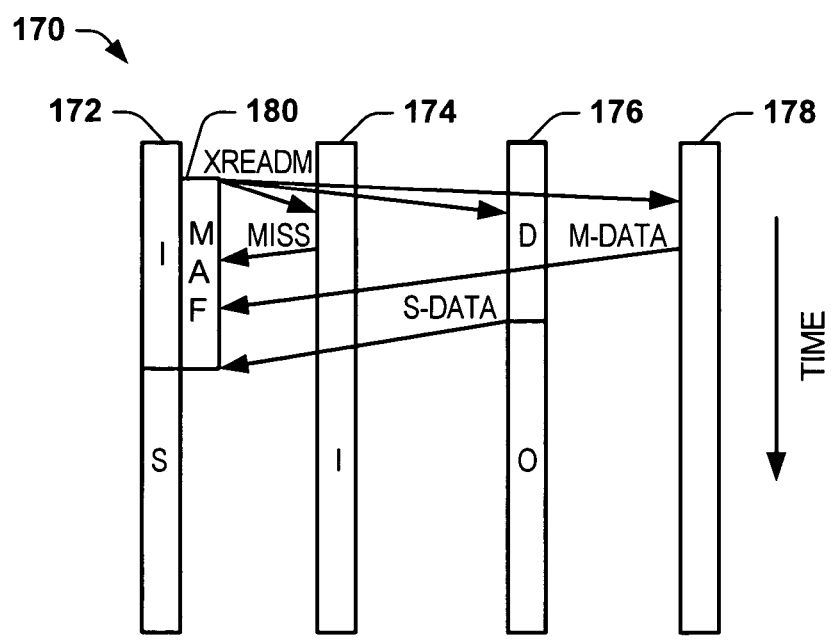
FIG. 5 depicts a second example scenario illustrating state transitions for a coherency protocol.

FIG. 5 illustrates a second example scenario in which a network 170 includes a source node 172, target nodes 174 and 176 and a home node 178. Initially, the nodes 172 and 174 are in an I-state for a particular cache line, the node 176 is in the D-state for the cache line, and the home node 178 contains a memory copy of the data associated with the cache line. The source node 172 allocates a MAF entry 180 for the requested data and broadcasts a migratory read request (XREADM) to the other nodes 174, 176, and 178. Node 174, being in the I-state, returns a MISS response. The target node 176 provides a shared S-DATA response to the source node 172, and transitions from the D-state to the O-state. The home node 178 returns M-DATA to the source node 172. The source node 172 accepts the S-DATA over the M-DATA because the S-DATA may be more up-to-date than the M-data. The source node 172 places the data in cache and transitions from the I-state to the S-state. As a result, the data, which may be more up-to-date than the home node 178, is thus shared by the target node 176 and the source node 172. The target node 176, while in the O-state (i.e., defining a cache ordering point), can respond to additional requests for the data by providing shared copies of the data, but the data cannot migrate. As a result, the ordering point for the data will remain at the target node 176 until the data is displaced, at which time the home node 178 will be updated.

Figure 6:
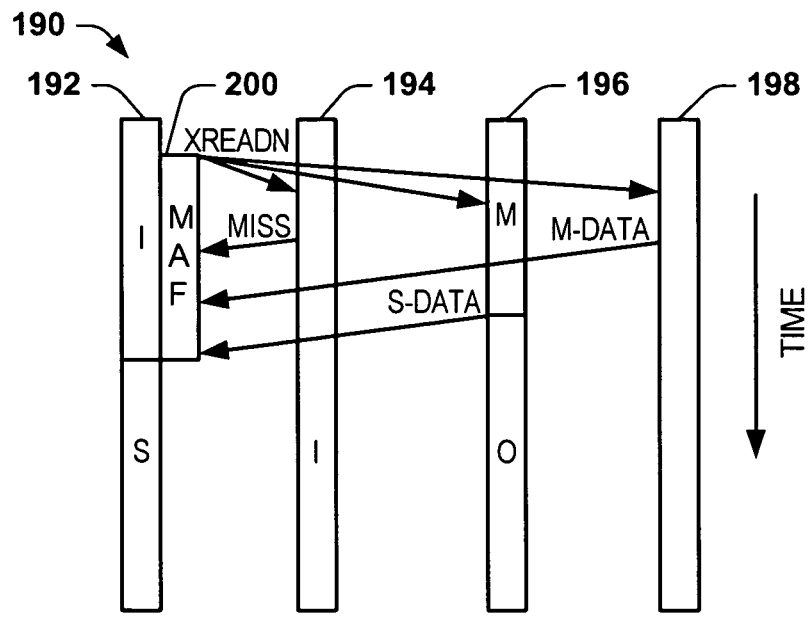
FIG. 6 depicts a third example scenario illustrating state transitions for a coherency protocol.

FIG. 6 illustrates a third example scenario in which a network 190 includes a source node 192, target nodes 194 and 196 and a home node 198. Initially, the nodes 192 and 194 are in an I-state for a particular cache line, the node 196 is in the M-state for the cache line, and the home node contains a memory copy of the data associated with the cache line. The source node 192 allocates a MAF entry 200 for the requested data and broadcasts a non-migratory read request (XREADN) to the other nodes 194, 196, and 198. Node 194, being in the I-state, returns a MISS response. The target node 196 provides a shared S-DATA response to the source node 192, and transitions from the M-state to the O-state. The home node 198 returns M-DATA to the source node 192. The source node 192 accepts the S-DATA over the M-DATA because the S-DATA may be more up-to-date than the M-data. The source node 192 placed the data in cache and transitions from the I-state to the S-state. As a result, the data, which may be more up-to-date than the home node 198, is thus shared by the target node 196 and the source node 192. The target node 196, while in the O-state (i.e., defining a cache ordering point), can respond to additional requests for the data by providing shared copies of the data, but the data cannot migrate. As a result, the ordering point for the requested data will thus remain at the target node 196 until the data is displaced, at which time the home node 198 will be updated. Thus, in this third example scenario, the data does not migrate from the target node 196 to the source node 192, even though the network was in a condition for permitting migration (the target node 196 contained M-state data). In this third example scenario, the XREADN request prevented the migration from taking place.

Figure 7:
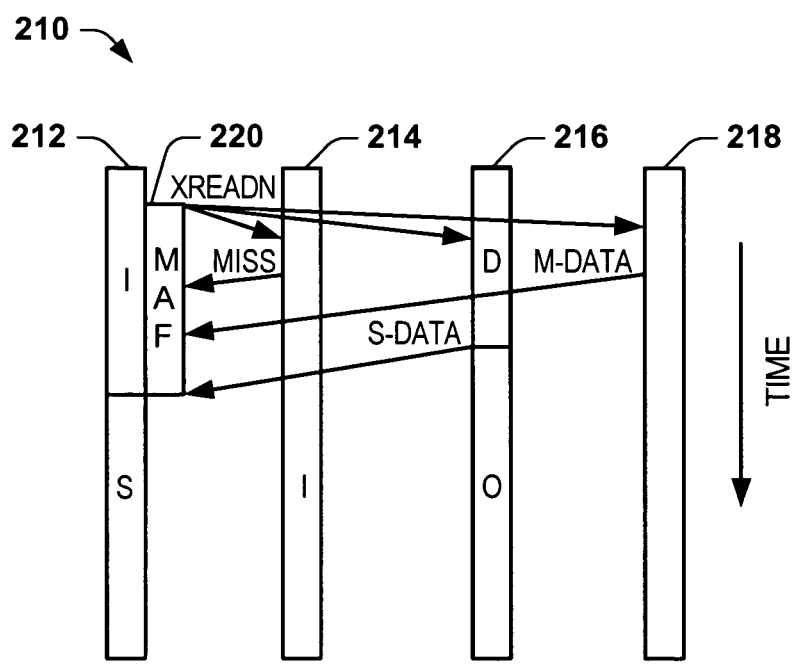
FIG. 7 depicts a fourth example scenario illustrating state transitions for a coherency protocol.

FIG. 7 illustrates a fourth example scenario in which a network 210 includes a source node 212, target nodes 214 and 216 and a home node 218. Initially, the nodes 212 and 214 are in an I-state for a particular cache line, the node 216 is in the D-state for the cache line, and the home node contains a memory copy of the data associated with the cache line. The source node 212 allocates a MAF entry 220 for the requested data and broadcasts a non-migratory read request (XREADN) to the other nodes 214, 216, and 218. Node 214, being in the I-state, returns a MISS response. The target node 216 provides a shared S-DATA response to the source node 212, and transitions from the D-state to the O-state. The home node 218 returns M-DATA to the source node 212. The source node 212 accepts the S-DATA over the M-DATA because the S-DATA may be more up-to-date than the M-data. The source node 212 places the data in cache and transitions from the I-state to the S-state. As a result, the data, which may be more up-to-date than the home node 218, is thus shared by the target node 216 and the source node 212. The target node 216, while in the O-state, can respond to additional read-only requests for the data by providing shared copies of the data, but the data cannot migrate. As a result, the ordering point for the requested data will thus remain at the target node 216 until the data is displaced, at which time the home node 218 will be updated. It will be appreciated that, in this fourth example scenario, the target node 216 contained D-state data and, therefore, migration would not have occurred even if an XREADM request was used. The XREADN request thus can help ensure that the data is prevented from migrating from the target node 216 to the source node 212.

Figure 8:
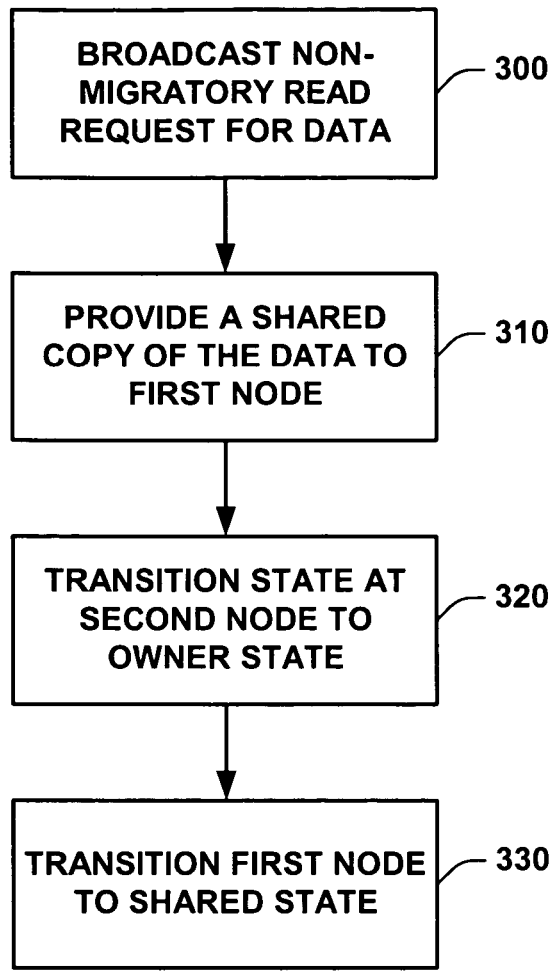
FIG. 8 depicts a flow diagram illustrating a method.

FIG. 8 depicts a method that includes broadcasting a non-migratory request for data from a first node to other nodes of an associated system, as shown at 300. The method also includes providing a shared copy of the data from a second node to the first node in response to the non-migratory request, as shown at 310. The method also includes transitioning a state associated with the data at the second node from a modified state to an owner state in response to the non-migratory request, as shown at 320. The method further includes transitioning the state associated with the data at the first node to a shared state in response to receiving the data from the second node, as shown at 330.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
   a first node including data having an associated state, the associated state of the data at the first node being a modified state; and
   a second node operative to provide a non-migratory source broadcast request for the data, the first node being operative in response to the non-migratory source broadcast request to provide the data to the second node and to transition the associated state of the data at the first node from the modified state to an owner state without updating memory, the second node being operative to receive the data from the first node and assign a shared state to an associated state of the data at the second node.

2. The system of claim 1, wherein the second node is further operative to provide a migratory source broadcast request for the data, the first node being operative in response to the migratory source broadcast request to provide the data to the second node and to transition the associated state of the data at the first node from the modified state to an invalid state without updating memory, the second node being operative to receive the data from the first node and assign the associated state of the data at the second node to a dirty state.

3. The system of claim 2, wherein the first node is operative in response to the migratory source broadcast request to provide an ownership data response to the second node.

4. The system of claim 2, wherein the associated state of the data at the second node being the dirty state makes the data at the second node available for migration to other nodes.

5. The system of claim 2, wherein the second node is further operative to write the data to the second node and transition the associated state of the data at the second node from the dirty state to the modified state, the associated state of the data at the second node being the modified state making the data at the second node available for migration to other nodes providing a migratory source broadcast request for the data.

6. The system of claim 2, wherein the second node is programmed with instructions to selectively invoke one of the non-migratory source broadcast request and the migratory source broadcast request.

7. The system of claim 2, wherein the second node is programmed with instructions that provide a predictive selection to invoke one of the non-migratory source broadcast request and the migratory source broadcast request.

8. The system of claim 1, wherein the first node is operative in response to the non-migratory source broadcast request to provide a shared data response to the second node.

9. The system of claim 1, wherein further migration of the data from the second node is precluded when the associated state of the data at the second node is the shared state.

10. The system of claim 1, further comprising at least one other node that provides a non-data response to the second node in response to the non-migratory source broadcast request from the second node, the non-data response indicating that the at least one other node does not have a valid copy of the data requested by the second node.

11. The system of claim 1, wherein the first node defines a first processor and the second node defines a second processor, the first and second processors each having an associated cache that comprises a plurality of cache lines, each cache line having a respective tag address that identifies associated data and each cache line having state information that indicates a state of the associated data for the respective cache line, the first and second processors being capable of communicating with each other and with a system memory via an interconnect, the system further comprising a first cache controller associated with the first processor and a second cache controller associated with the second processor, the first cache controller being operative to manage data requests and responses for the associated cache of the first processor, the first cache controller effecting state transitions associated with the data in the associated cache of the first processor based on the data requests and responses for the associated cache of the first processor, the second cache controller being operative to manage data requests and responses for the associated cache of the second processor, the second cache controller effecting state transitions associated with the data in the associated cache of the second processor based on the data requests and responses for the associated cache of the second processor.

12. A multi-processor network comprising:
   memory for storing data;
   a first processor node having a first processor node cache line including the data, the first processor node cache line having an associated state, the associated state of the first processor node cache line being a modified state; and
   a second processor node operative to provide a non-migratory source broadcast read request for the data, the second processor node having a second processor node cache line with an associated state;
   the first processor node being programmed to respond to the non-migratory source broadcast read request of the second processor node by providing a shared data response to the second processor node and transitioning the associated state of the first processor node cache line from the modified state to an owner state without updating the memory with the data, the data being stored in the second processor node cache line, the associated state of the second processor node cache line being assigned a shared state.

13. The network of claim 12, wherein the second processor node is further operative to provide a migratory source broadcast read request for the data, the first processor node being programmed to respond to the migratory source broadcast read request of the second processor node by providing an ownership data response to the second processor node and transitioning the associated state of the first processor node cache line from the modified state to an invalid state without updating the memory with the data, the data from the ownership data response being stored in the second processor node cache line and the state associated with the second processor node cache line being assigned a dirty state.

14. The network of claim 13, wherein the data stored in the second processor node cache line assigned the dirty state is available for migration to other nodes.

15. The network of claim 13, wherein the second processor node is further operative to write the data stored in the second processor node cache line assigned the dirty state and transition the state associated with the second processor node cache line from the dirty state to the modified state, the data stored in the second processor node cache line assigned the modified state being available for migration to other nodes providing a migratory source broadcast read request for the data.

16. The network of claim 13, wherein the second processor node is programmed with instructions to selectively invoke one of the non-migratory source broadcast read request and the migratory source broadcast read request to obtain the data.

17. The network of claim 13, wherein the second processor node is programmed with instructions to predictively select one of the non-migratory source broadcast read request and the migratory source broadcast read request to obtain the data.

18. The network of claim 12, wherein further migration of the data from the second processor node is precluded when in the shared state.

19. The network of claim 12, further comprising at least one other processor node that provides a non-data response to the second processor node in response to the non-migratory source broadcast read request from the second processor node, the non-data response indicating that the at least one other processor node does not have a valid copy of the data requested by the second processor node.

20. The network of claim 12, wherein the first and second processor nodes each have an associated cache that comprises a plurality of cache lines, each cache line having a respective tag address that identifies associated data and each cache line having state information that indicates a state of the associated data for the respective cache line, the first and second processor nodes being capable of communicating with each other and with the memory via an interconnect, the system further comprising a first cache controller associated with the first processor node and a second cache controller associated with the second processor node, the first cache controller being operative to manage data requests and responses for the associated cache of the first processor node, the first cache controller effecting state transitions associated with the data in the cache of the first processor node based on the data requests and responses for the associated cache of the first processor node, the second cache controller being operative to manage data requests and responses for the associated cache of the second processor node, the second cache controller effecting state transitions associated with the data in the associated cache of the second processor node based on the data requests and responses for the associated cache of the second processor node.

21. A system comprising:
means for broadcasting from a first node a non-migratory read (XREADN) request for data;
means for providing the data from a second node to the first node in response to the XREADN request, a modified state being associated with the data at the second node, a shared state being be g associated with the data at the first node in response to the first node receiving the data from the second node; and
means for transitioning the modified state associated with the data at the second node to an owner state without updating memory of the system.

22. The system of claim 21, further comprising:
means for broadcasting from the first node a migratory read (XREADM) request for data;
means for providing the data from the second node to the first node in response to the XREADM request, the modified state being associated with the data at the second node, the shared state being associated with the data at the first node in response to the first node receiving the data from the second node; and
means for transitioning the modified state associated with the data at the second node to an invalid state without updating memory of the system.

23. The system of claim 22, further comprising means for selecting one of the XREADM request and XREADN request to broadcast from the first node.

24. The system of claim 22, further comprising means for predictively selecting one of the XREADM request and XREADN request to broadcast from the first node.

25. A method comprising:
broadcasting a non-migratory request for data from a first node to other nodes of an associated system;
providing a shared copy of the data from a second node to the first node in response to the non-migratory request;
transitioning a state associated with the data at the second node from a modified state to an owner state in response to the non-migratory request; and
transitioning a state associated with the data at the first node to a shared state in response to receiving the shared copy of the data from the second node.

26. The method of claim 25, further comprising:
broadcasting a migratory request for the data from the first node to other nodes of the associated system;
providing an ownership data response from the second node to the first node in response to the migratory request;
transitioning the state associated with the data at the second node from a modified state to an invalid state data in response to the migratory request; and
transitioning the state associated with the data at the first node to a dirty state in response to receiving the ownership data response from the second node.

27. The method of claim 26, further comprising selecting one of the migratory request and the non-migratory request to broadcast from the first node.

28. The method of claim 26, further comprising predictively selecting one of the migratory request and the non-migratory request to broadcast from the first node.

* * * * *

UNITED STATES PATENT AND TRADEMARK OFFICE
CERTIFICATE OF CORRECTION

PATENT NO. : 8,468,308 B2
APPLICATION NO. : 10/760659
DATED : June 18, 2013
INVENTOR(S) : Simon C. Steely, Jr. et al.

It is certified that error appears in the above-identified patent and that said Letters Patent is hereby corrected as shown below:

In the Specification:

In column 12, line 67, delete "M>1" and insert -- $M \geq 1$ --, therefor.

In the Claims:

In column 24, line 4, in Claim 21, delete "being be g" and insert -- being --, therefor.

Signed and Sealed this
Seventeenth Day of September, 2013

Teresa Stanek Rea
*Deputy Director of the United States Patent and Trademark Office*